United States Patent [19]

Araki

[11] Patent Number: 4,992,927
[45] Date of Patent: Feb. 12, 1991

[54] SELF-PROPAGATING CONTROL APPARATUS AND METHOD, PROPAGATING-TYPE CONTROLLER USED BY SAID APPARATUS, METHOD OF OPERATING AND CONTROLLING SAME, AND SUPERVISOR

[75] Inventor: Mitsuhiko Araki, Kyoto, Japan

[73] Assignee: Omron Tateisi Electronics Co., Kyoto, Japan

[21] Appl. No.: 311,342

[22] Filed: Feb. 15, 1989

[30] Foreign Application Priority Data

Feb. 20, 1988 [JP] Japan ................................. 63-36488

[51] Int. Cl.$^5$ ............................................ G05B 13/02
[52] U.S. Cl. .................................. 364/160; 364/162; 364/138
[58] Field of Search ............................... 364/149–151, 364/160–162, 157, 138, 148

[56] References Cited

U.S. PATENT DOCUMENTS

| | | | |
|---|---|---|---|
| 4,213,175 | 7/1980 | Kurihara | 364/161 |
| 4,602,326 | 7/1986 | Kraus | 364/160 |
| 4,639,853 | 1/1987 | Rake et al. | 364/149 |
| 4,791,548 | 12/1988 | Yoshikawa et al. | 364/160 |

OTHER PUBLICATIONS

Journal A, vol. 27, No. 3, Jul. 1986, Antwerpen Be pp. 175–183; H. J. Jansma et al.; "An Industrial Approach Towards the Development of a Multivariable Self-Tuner".

Instruments and Control Systems, Mar. 1970, Radnor U.S., pp. 101–105; E. H. Bristol et al.; "Adaptive Process Control by Pattern Recognition".

Primary Examiner—Jerry Smith
Assistant Examiner—Paul Gordon
Attorney, Agent, or Firm—Dickstein, Shapiro & Morin

[57] ABSTRACT

A self-propagating control apparatus includes a propagating-type controller, which has a proportional integration element and a plurality of phase compensation elements, and a supervisor for judging the status of a controlled system and delivering commands to the propagating-type controller. The apparatus is characterized in that operation starts out from a PID action, which is based on experience accumulated at the site, and the propagating-type controller is caused to propagate or self-enhance under the supervision of the supervisor to gradually improve capability. The apparatus exploits on-site experience and is capable of exceeding limitations PID control without requiring a high level of expertise for design and readjustment.

8 Claims, 11 Drawing Sheets

SELF-PROPAGATING CONTROL APPARATUS AND METHOD, PROPAGATING-TYPE CONTROLLER USED BY SAID APPARATUS, METHOD OF OPERATING AND CONTROLLING SAME, AND SUPERVISOR

BACKGROUND OF THE INVENTION

1. Field of the Invention

This invention relates to a control apparatus of the type in which a controlled variable from a controlled system and a target value are received as inputs and a manipulated variable of the controlled system is outputted after such processing operations as proportional integration, phase advance and phase delay are performed. More particularly, the invention relates to a control apparatus having a self-propagating function with regard to the aforementioned processing, as well as the associated control method. The invention further relates to a propagating-type controller, which is one of the elements constituting the self-propagating control apparatus, a supervisor, a method of operating the propagating-type controller, and a method of controlling the same.

2. Description of the Prior Art

The arrangement of a conventional PID-type controller is fixed to a combination of the three operations of proportion, integration and differentiation, and the parameters of each operation are adjusted by on-site technicians having special know-how. Since the arrangement of such a PID-type controller is fixed, there is a limitation upon control capability. In addition, since readjustment of the parameters requires skilled technicians, it is difficult to hold the parameters at the optimum values, which depend upon a change in the state of the controlled system at a plant or the like, a change in the working conditions, etc.

A PID-type control apparatus having an automatic adjusting function and a control system based upon modern control theory are available as techniques which compensate for the drawbacks of the PID-type controller. An optimal control system and an adaptive control system are two typical examples of control systems based on modern control theory.

A PID-type control apparatus having an automatic adjusting function refers to an apparatus which maintains excellent control capability by automatically adjusting the parameters of the PID-type controller, which performs the three operations of proportion, integration and differentiation. Rules for adjusting parameters include those derived theoretically and those derived experimentally, fuzzy-type adjustment rules and adjustment rules based on knowledge engineering. The controllers used include the conventional PID controller, I-PD controller, a PID controller having two degrees of freedom, etc.

The PID-type control apparatus having an automatic adjusting function possesses a function in which a parameter is held at an optimum value within the range of the controller incorporated in advance. With this apparatus, however, the structure of the controller is fixed at a specific combination of the three operations of proportion, integration and differentiation, and the apparatus does not possess a function for changing the controller structure itself in dependence upon the complexity of the controlled system. Accordingly, this control apparatus is incapable of demonstrating capabilities which exceed the limitations of its function as a PID-type controller.

The optimal control system, which is one of the control systems based on modern control theory, is adapted to initially obtain a dynamic characteristic of the controlled system in accurate fashion, decide the structure of the controller having the necessary complexity in accordance with the dynamic characteristic, and decide parameters based on a fixed evaluation criterion. (For example, see "Design Theory of a Linear Control System" presented by Ito, Kimura and Hosoe at the Measurement Automatic Control Society, 1978.) In accordance with the optimal control system, a capability which exceeds the limitations of the PID-type controller can be obtained from the outset. However, when a controller in which this method of control is capable of being incorporated in general form is fabricated, costs are extremely high owing to the complexity of the arrangement. In all of the examples of application so far disclosed, each control apparatus has been manufactured for a particular controlled system. Furthermore, in order to design and readjust the control apparatus, it is necessary to perform experiments for accurate identification of the dynamic characteristic of the controlled system, and the technicians concerned with adjustment must possess a high level of theoretical knowledge with regard to methods of deciding optimum gain and methods of constructing observers. In consideration of the price of the anticipated control apparatus per se, the labor required for design and readjustment and the technical level, it is clear that even if a general-purpose industrial controller based on the optimal control method is manufactured, it will merely be high in price and difficult in handling, thus making it difficult to introduce at a site which exhibits only average technical capabilities and where there is little time to spare.

Among the adaptive control systems based on modern control theory, a normative model-type adaptive control system, of which there are many practical examples, is adapted to predict the range of a fluctuation in the characteristic of a controlled system, incorporate the achievable control capability in the control apparatus in the form of a normative model in a case where the fluctuation is at its worst, and adjust the parameters in such a manner that the control system will maintain a capability the same as that of the normative model. (For example, see "Adaptive Control" by Ichikawa, Kanai, Suzuki, Kokumura, Shobido, 1984.) In regard to this system, it has been demonstrated theoretically that effective control is performed if an input richness condition and a condition relating to the fluctuation in the characteristic of the controlled system are satisfied. With such a system, a fixed control capability can be maintained which does not depend upon the fluctuation in the controlled system characteristic and the working conditions. However, as with the case of the optimal control system, a controller in which this type of control method is capable of being incorporated is high in cost. Consequently, the examples of application disclosed mainly employ a device which is separately provided. In addition, with regard to design and readjustment, a very high level of theoretical expertise is required in order to verify the input richness condition, select the normative model and verify stable conditions, etc. In the end, therefore, it is difficult to realize the controller as one which is for general-purpose, industrial use, and difficult to use the controller at a site where there is only an average technical level.

To sum up the foregoing, a PID-type control apparatus having an automatic adjusting function fixes the arrangement of the controller and adjusts only parameters and therefore is disadvantageous in that it cannot exceed the limitation upon the capabilities of the PID-type controller. On the other hand, the control systems based on modern control theory strive to perform optimal control from the start or determine the goal of the control capability in advance. Consequently, these control systems are disadvantageous in that they are merely high in cost as general-purpose controllers and require a high level of theoretical expertise for design and readjustment.

SUMMARY OF THE INVENTION

An object of the present invention is to realize a comparatively inexpensive general-purpose control apparatus which has the ability to exceed the limitations on the control capability of a PID-type controller, and which does not require a high level of theoretical expertise for design and readjustment, and to the associated control method.

Another object of the present invention is to provide a propagating-type controller which constitutes the abovementioned general-purpose control apparatus, namely a self-propagating control apparatus, as well as a supervisor for controlling this controller.

A further object of the present invention is to provide a method of operating the abovementioned propagating-type controller as well as a method of controlling the same.

A self-propagating control apparatus according to the present invention comprises a propagating-type controller, to which a controlled variable obtained from a controlled system and a given target value are applied as inputs, for calculating and outputting a manipulated variable for the controlled system, and a supervisor for controlling the propagating-type controller. The propagating-type controller has a proportional integration element, a plurality of phase elements, and control means which, in accordance with a command from the supervisor, creates a serially arrayed structure of the proportional integration element and a commanded number of the phase elements and applies commanded parameters to these elements, and which outputs, as the manipulated variable, a response of the serially arrayed structure to an offset between the target value and controlled variable. The supervisor has means for judging the status of a control system based on the given target value and the controlled variable, and propagating control means for calculating a characteristic quantity of the control system when a judgment is rendered to the effect that the status of the control system is predetermined and applying a command relating to the number of phase elements and the parameter of each element to the propagating-type controller based on the characteristic quantity or an inputted initial command.

A self-propagating control method according to the present invention is characterized by the steps of creating a serially connected structure of a proportional integration element and requisite ones of a plurality of phase elements and applying parameters to these elements in response to an initial command inputted through an input unit, calculating a characteristic quantity of a controlled system based on a given target value and a controlled variable, judging based on the characteristic quantity whether the phase elements are to be increased, and, when judgment is rendered to the effect that the phase elements are to be increased, creating parameters of the additional phase elements, adding these new phase elements to the serially connected structure and connecting them thereto.

The present invention further provides a propagating-type controller, to which a controlled variable obtained from a controlled system and a given target value are applied as inputs, for calculating and outputting a manipulated variable for the controlled system. The propagating-type controller is controlled by a supervisor and is characterized by having a proportional integration element, a plurality of phase elements, and control means which, in accordance with a command from the supervisor, creates a serially arrayed structure of the proportional integration element and a commanded number of the phase elements and applies commanded parameters to these elements, and which outputs, as the manipulated variable, a response of the serially arrayed structure to an offset between the target value and controlled variable.

A method of operating the abovementioned propagating-type controller according to the invention is characterized by steps of decoding commands from the supervisor, increasing the number of phase elements stored in a memory and setting parameters thereof when the commands include a propagation command, and outputting the manipulated variable upon executing processing, with respect to an offset between the inputted target value and controlled variable, in accordance with the proportional integration element and phase elements inclusive of the increased number of phase elements.

The invention provides also a supervisor for controlling a propagating-type controller used in the abovementioned self-propagating control apparatus and having a structure in which a proportional integration element and a requisite number, inclusive of zero, of phase elements are serially arrayed.

The supervisor according to the invention is characterized by having means for judging whether controlled system is stable based on an inputted controlled variable, means for judging status inclusive of a convergency judgment, oscillation judgment and maximum value range judgment when the controlled system is judged to be stable, means for calculating a characteristic quantity of the control system when the judged states satisfy given conditions, and means for judging, based on the calculated characteristic quantity, whether the phase elements are to be increased, and for deciding parameters of these elements when they are to be increased.

Further, the present invention provides a control method for controlling a propagating-type controller having a structure in which a proportional integration element and a requisite number, inclusive of zero, of phase elements are serially arrayed. The control method is characterized by the steps of judging whether a controlled system is stable based on an inputted controlled variable, judging status inclusive of a convergency judgment, oscillation judgment and maximum value range judgment when the controlled system is judged to be stable, calculating a characteristic quantity of the controlled system when the judged states satisfy given conditions, and judging, based on the calculated characteristic quantity, whether the phase elements are to be increased, and deciding parameters of these elements when they are to be increased.

Preferably, the control method includes a step of generating an emergency operation command when it is judged that the controlled system is not stable. Further, it is preferred that the control method include a step of generating an acceleration action command if, when a judged status does not satisfy a given condition, the condition is a fixed condition.

In accordance with the self-propagating control apparatus of the present invention, the following effects are obtained by operating the propagating-type controller and the supervisor organically:

At the beginning of use, the control capability is the same as that of the ordinary PID-type control apparatus, and the experience and knowledge of the operator are reflected in the settings of the PID parameters.

After use starts, the controller propagates and the control capability is gradually improved. The limit on the improvement in control capability is decided by the scale (i.e., the upper limit of the number of phase elements) of the propagating-type controller, and the environment (mainly the magnitude and frequency band of observed noise) in which the controlled system is installed.

The propagating-type controller is such that the degree thereof (the degree of the transfer function) is increased by increasing the number of phase elements. However, when the degree of the controller surpasses the degree (the degree of the transfer function) of the controlled system, it is possible to achieve a capability equivalent to that of a dynamic stabilizing compensator, which represents modern control theory.

BRIEF DESCRIPTION OF THE DRAWINGS

FIGS. 8a, b are graphs illustrating examples of application of the self-propagating control apparatus, in which FIG. 8a shows the course of an improvement in control capability and FIG. 8b shows the indicial response of a final stage;

FIGS. 9a, b are graphs illustrating comparison (first) with a PID indicating controller, in which FIG. 9a shows a response waveform achieved by a self-propagating control apparatus and FIG. 9b shows a response waveform in accordance with a PID indicating controller designed according to the Chien-Hrones-Reswick method;

FIGS. 10a, b are graphs illustrating comparison (second) with a PID indicating controller, in which FIG. 10a shows a response waveform achieved by a self-propagating control apparatus and FIG. 10b shows a response waveform in accordance with a PID indicating controller designed according to the transient response method of Ziegler-Nichols; and FIGS. 11a, b are graphs illustrating comparison with an adaptive control apparatus, in which FIG. 11a shows a response waveform achieved by a self-propagating control apparatus and FIG. 11b shows a response waveform of a normative model-type adaptive control system.

DESCRIPTION OF THE PREFERRED EMBODIMENT (1) Outline of Overall Arrangement

Figure 1:
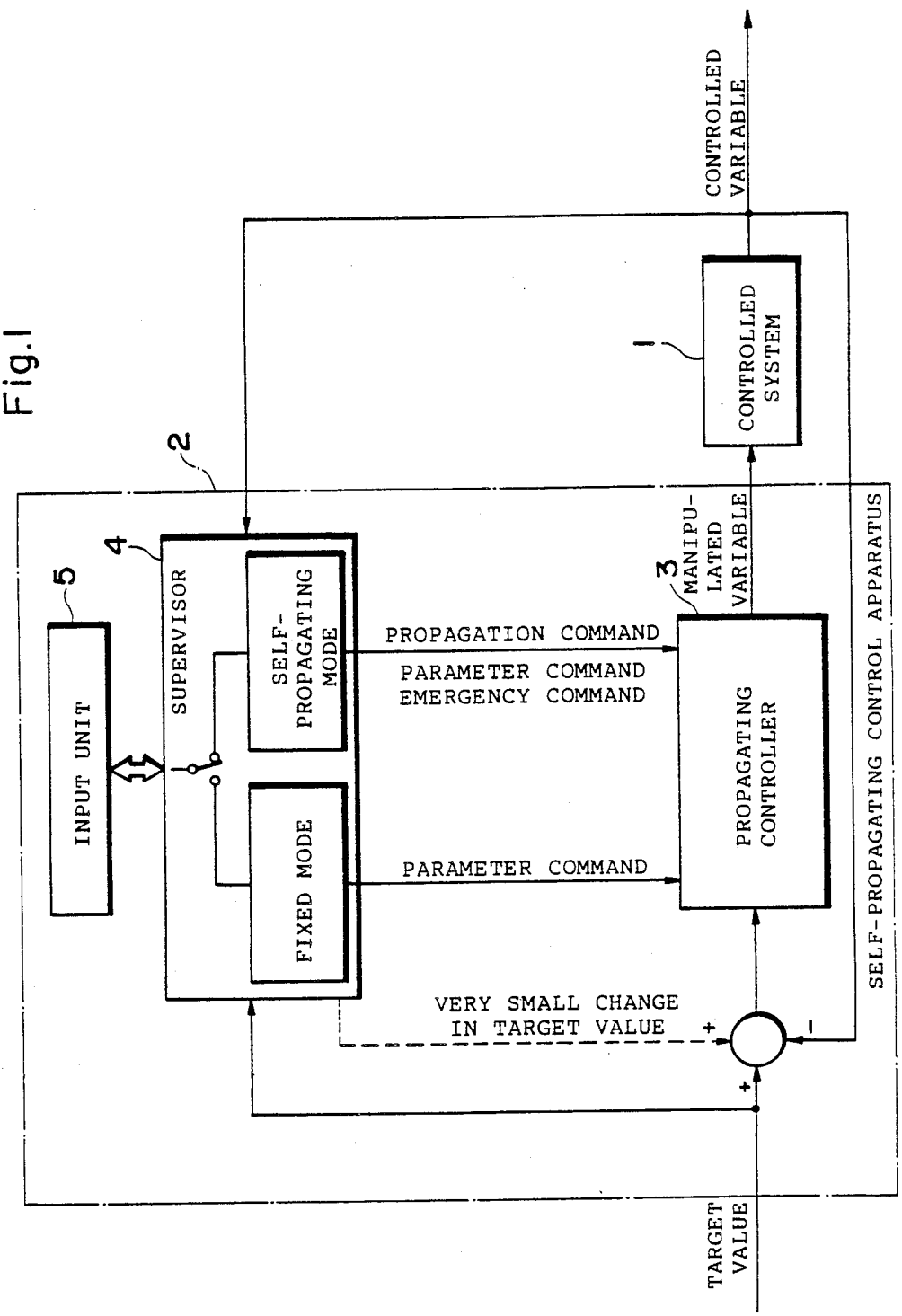
FIG. 1 is a block diagram schematically illustrating the overall arrangement of a control system.

The general features of the arrangement of a control system are illustrated in FIG. 1, in which a control apparatus 2 having a self-propagating function basically comprises a propagating-type controller 3 and a supervisor 4.

The propagating-type controller 3, the input to which is an offset between a given target value and the controlled variable of a controlled system 1, performs a predetermined computation to output a manipulated variable, which is applied to the controlled system 1. The propagating-type controller 3 has a structure in which a single proportional integration (PI) element and a plurality of phase advance/delay elements (called to as "phase elements" when referred to generically) are arrayed in series with the controlled system 1, and possesses a function in which the number of phase elements used is increased or decreased in accordance with a command from the supervisor 4 (the number of phase elements generally being increased, though a decrease is made in special cases, namely in an emergency operation). The parameters of the proportional integration element and of the phase elements used are set or altered by the supervisor 4.

More specifically, the propagating-type controller 3 is implemented by a computer system which includes a CPU. Accordingly, the proportional integration element and the phase elements are programmed arithmetic routines. One proportional integration arithmetic routine and a number of phase arithmetic routines are prepared for the propagating-type controller in advance, and the number of phase arithmetic routines to be executed is decided by the supervisor 4. The propagating-type controller 3 is equipped with a memory which stores various parameters inclusive of a number m of phase elements to be used, with m being commanded by supervisor 4.

The supervisor 4 possesses a self-propagating mode and a fixed mode, which will be described later in further detail. These modes are set by the operator through an input unit 5 peripheral to the supervisor 4. In the self-propagating mode, the supervisor 4 functions to receive an inputted target value, observe the controlled variable of the controlled system 1, judge the status of the controlled system and calculate the necessary characteristic quantity based on the results of observation, and, based on the results of judgment and the results of calculation, output a propagation command to the propagating-type controller 3 as well as commands for setting and altering parameters. In the fixed mode, the supervisor 4 transmits a parameter command (inclusive of the number m of phase elements used), which is applied via the input unit 5, to the propagating-type controller 3. By way of example, a keyboard which includes numeric keys, function keys and the like is well suited for use as the input unit 5.

The supervisor 4 also has a function for applying a very small change to a given target value. This is used in a case where capability is to be rapidly improved.

The supervisor 4 also is implemented by a computer system which includes a CPU. Though the control apparatus 2 is shown to be divided into the propagating-type controller 3 and supervisor 4, it goes without saying that the controller 3 and supervisor 4 can be implemented by a single computer system. Conversely, the controller 3 and supervisor 4 may be implemented by respective multiple-CPU systems.

(2) Arrangement and Function of Propagating-type Controller 3

The propagating-type controller 3 has a proportional integration element and a plurality of phase elements, as set forth above.

A transfer function $G_{PI}(s)$ of the proportional integration element (PI element) is as follows:

$$G_{PI}(s) = \begin{cases} K & \text{when } T_0 = 0 \\ & \text{(a proportional element)} \\ K[1 + 1/T_0 s] & \text{when } T_0 > 0 \end{cases} \quad (1)$$

(a proportional integration element, obtained by adding an integration element)

The values of the parameters K and $T_0$ (K: gain, $T_0$: time constant) are decided by the supervisor 4.

A transfer function $G_{li}(s)$ is expressed by the following equation, with $T_i$, $\gamma_i$ serving as the parameters, and the equation takes on the following forms in accordance with the parameter $\gamma_i$:

$$G_{li}(s) = \begin{cases} (1 + T_i s)/(1 + \gamma_i T_i s) & \gamma_i > 0 \\ 1/(1 + T_i s) & \gamma_i = 0 \end{cases} \quad (2)$$

Here i represents the number of the phase element. The values of the parameters $T_i$ and $\gamma_i$ are decided by the supervisor 4. $G_{li}(s)$ acts as a phase advance when $0 < \gamma_i < 1$ holds and as a phase delay when $\gamma_i > 1$ holds.

The overall transfer function $G_c(s)$ of the propagating-type controller 3 is as follows:

$$G_c(s) = K[1 + (1/T_0 s)][(1/T_1 s)/(1 + \gamma_1 T_1 s)] \quad (3)$$
$$\ldots [(1/T_m s)/(1 + \gamma_m T_m s)]$$

Here m represents the number of phase elements used and is increased or decreased in accordance with the propagation command from the supervisor 4.

The operating characteristic of the overall propagating-type controller 3 varies as follows depending upon the values of the parameters m, $T_0$:

① When m=0 holds, the transfer function $G_c(s)$ is equal to $G_{PI}(s)$. Accordingly, the element is a proportional element if $T_0 = 0$ holds and a proportional integration element if $T_0 > 0$ holds.

② When m=1, $T_0 > 0$ hold, the transfer function $G_c(s)$ is as follows:

$$G_c(s) = K[1 + (1/T_0 s)][(1/T_1 s)/(1 + \gamma_1 T_1 s)] \quad (4)$$

If the parameters here are set as follows:

$$T_0 = (1/2)\{T_I + \tau + [(T_I - \tau)^2 - 4T_I T_D]^{1/2}\}$$

$$T_1 = (1/2)\{T_I + \tau - [(T_I - \tau)^2 - 4T_I T_D]^{1/2}\}$$

$$\gamma_1 = \tau/T_I$$

$$K = K_p T_0/T_I \quad (5)$$

(where $K_p$, $T_I$, $T_D$ represent proportional gain, integration time and differentiation time, respectively) then $G_c(s)$ will be a PID element of the following kind, which uses approximate integration:

$$G_c(s) = K_p[1 + (1/T_I s) + T_D(s/1 + \tau s)] \quad (6)$$

where $T_I > 4T_D \gg \tau$ $\tau$: approximate differentiation time constant Only phase compensation (inclusive of a proportional element) is obtained when $T_0 = 0$ at m=1.

③ When m > 1 holds, $G_c(s)$ takes on the general form indicated by Eq. (3). This is none other than an integrating-type ($T_0 > 0$) or proportional-type ($T_0 = 0$) dynamic stabilizing compensator having a real pole (see the abovementioned literature "Design Theory of a Linear Control System" by Ito, et. al.).

(3) Supervisor Operating Theory

The supervisor 4 has a fixed mode and a self-propagating mode, as mentioned above. In the fixed mode, the values of the parameters of the propagating-type controller are set externally through the input unit 5. In the self-propagating mode, the values of the parameters of the propagating-type controller 3 are automatically altered depending upon judgments based on processing, described below, executed by the supervisor 4.

The changeover between the fixed mode and the self-propagating mode is performed by the operator through the input unit 5. In case where the control apparatus 2 is used in an ordinary manner, the operator first places the supervisor 4 in the fixed mode, initially sets the parameters and changes the supervisor over to the self-propagating mode after the control operation starts. It is of course possible for the operator himself to run the apparatus while suitably altering the parameters with the apparatus being held in the fixed mode. In a case where the control apparatus is changed over from the self-propagating mode to the fixed mode, the parameter values which prevail at the moment of the changeover are maintained as long as a new parameter setting is not made from the outside.

In the fixed mode, parameters are set by making any of the following four types of settings through the input unit 5:

① P setting

When a P setting is made, the conditions m=1, $T_0=0$ are set within the supervisor 4. It is necessary for the operator to set the value of the gain K by the input unit.

② PI setting

The condition m=1 is set. Furthermore, it is necessary to set the gain K and time constant $T_0$ by the input unit 5.

(3) PID setting

The condition m=2 is set.

Further, it is necessary for the operator to set the usual PID parameters $K_P$, $T_I$, $T_D$ and the approximate integration time constant $\tau$, which were mentioned above, by the input unit 5. The supervisor 4 computes the parameters $T_0$, $T_1$, $\gamma_1$, K in accordance with the aforementioned Eq. (5), and applies these values to the propagating-type controller 3.

(4) Optional setting

The operator sets the number m of phase elements of the propagating-type controller as well as the other parameters K, $T_0$, $T_i$, $\gamma_i$ all from the input unit 5.

The initial settings conforming to the experience and expertise of the operator are performed by selecting the four types of setting mentioned above. More specifically, a skilled operator is capable of exploiting his experience and expertise from the start of operation using the optional setting or the PID setting. By using the P setting and designating a sufficiently small gain K, an unskilled operator is capable of starting out from safe initial values and entrusting the improvement in control capability entirely to the self-propagating function of the control apparatus 2.

In the self-propagating mode, it is necessary for the operator to make inputs from the input unit 5 with regard to the following items:

(1) Advisability of using an integration element, and advisability of using a signal for applying a very small change to a target value When it is considered inappropriate in view the characteristic of the controlled system 1, use of an integration element can be prohibited. If use of a signal for applying a very small change to a target value is proper, the supervisor 4 uses this signal to infer the status of the control system. As a result, improvement can be made in the early stages of control but the control system is subjected to an unnecessary disturbance in the meantime.

(2) Shortest setting time t and initial setting time $t_2$

When shortest setting time $t_1$ elapses, the supervisor 4 judges that a sufficient improvement has been made in quick-response. Though it will suffice to enter the shortest time that can be expected as this time $t_1$, it is permissible to initially enter a somewhat larger value and then alter the value in due course. As for the initial setting time $t_2$, a value several times larger than the time constant of the control system 1 will suffice.

(3) Reference a of offset, and reference b of amount of overshoot

Both of these are given as a percentage with respect to the target value. If there is no particular designation given a=2%, b=20% shall hold in this embodiment, though any value can be employed as a matter of course.

(4) Emergency overshoot limit C, and emergency monitoring period $t_c$

These are used when an emergency operation is performed.

In the self-propagating mode, the supervisor 4 observes the input and output of the control system and infers the status of the control system based thereon. This is referred to as an "observing action".

The control apparatus is designed based on the results of the observing action, and the results of design are applied to the controller as a parameter command. This is referred to as a "designing action".

When it is judged that the control system has become unstable, emergency measures are taken. This is referred to as an "emergency action".

The observing action and designing action are carried out based on a control capability estimating method and serial compensating method in classic control theory (see Chapters 6 and 7 of "Basic Control Engineering", edited by Fumiharu Kondo Morikita Publishing, 1977). There are many kinds of these operating methods depending upon the type of method used to apply classical control theory. Some fundamental forms will be described in the next section.

Figure 2:
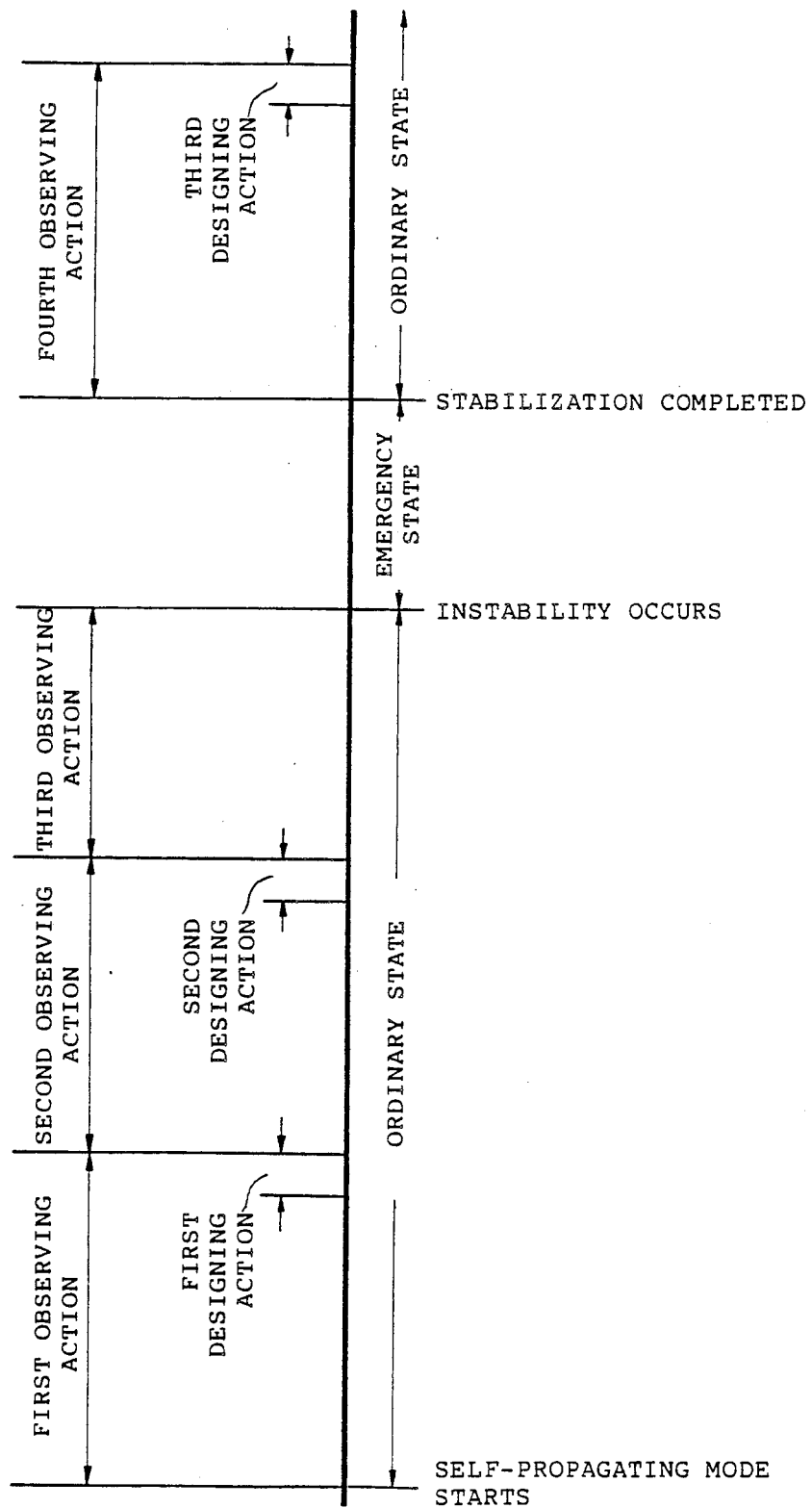
FIG. 2 is a time chart illustrating an example of the operation of a supervisor in a self-propagating mode.

(4) Fundamental Forms of Supervisor Operating Methods in the Self-propagating Mode FIG. 2 illustrates an example of a transition in the status of the supervisor 4 as well as an example of operating condition.

In order to achieve the functions described above, the supervisor 4 in the self-propagating mode assumes either an ordinary state or an emergency state. The observing action and designing action take place in the ordinary state.

The time at which the observing action starts can be the moment at which a target value has a step-like change, the moment at which the preceding observing action ends, or the moment at which execution of an immediately preceding emergency action ends. The moment at which the observing action ends is that at which the designing action ends or at which there is a transition to the emergency state.

The observing action comprises making judgments regarding the four items of convergency, oscillation, maximum value range and stability relating to a controlled variable, and deciding attendant parameters. The judgment regarding each of the abovementioned four items is performed as set forth below, where t represents time that has elapsed from the moment the observing action starts. By using the abovementioned initial setting time $t_2$, an observation unit time $t_3$ is set as follows: $t_3 = t_2$ following the start of supervisor operation, after which $t_3$ is modified according to the rules described below.

① Convergency judgment

Figure 3:
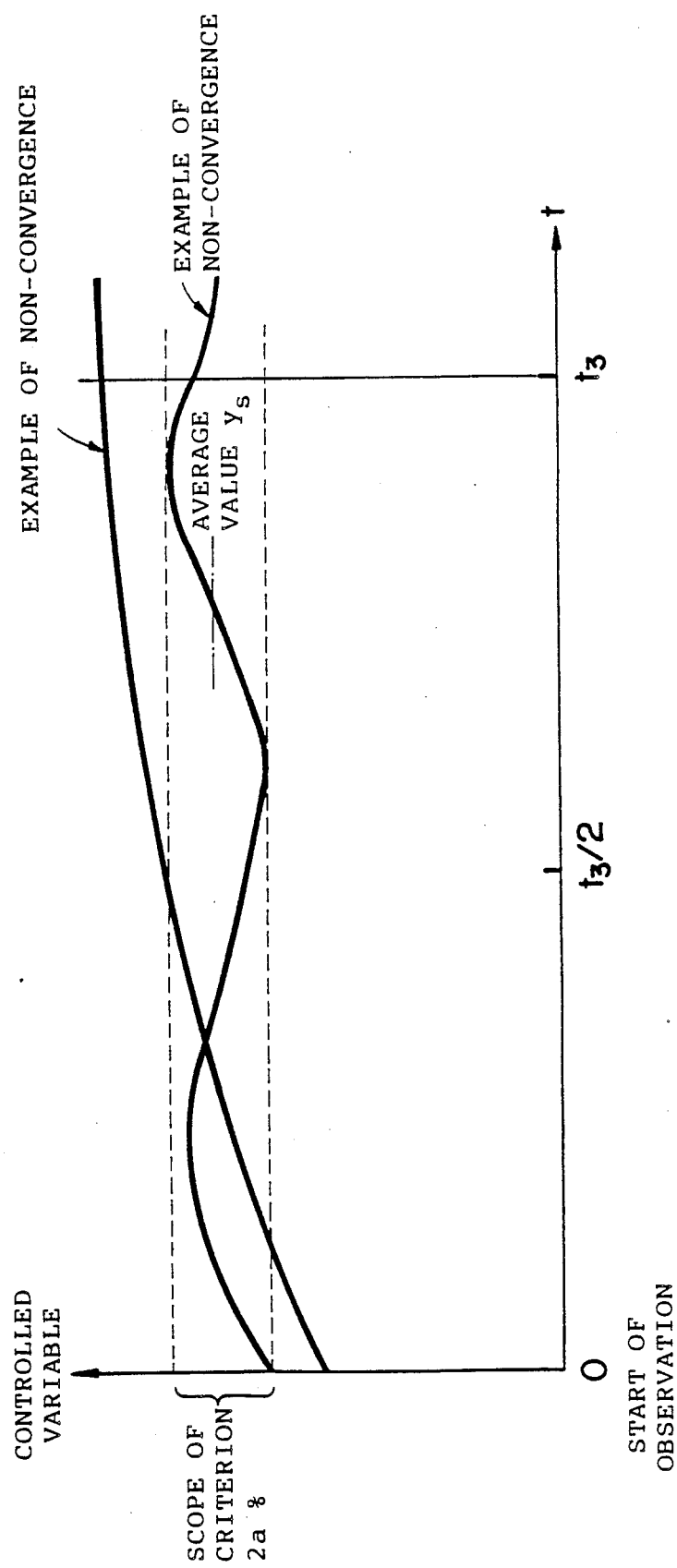
FIG. 3 is a graph for describing a convergency judgment.

If the range of a fluctuation in the controlled variable in the time $(t_3/2) \leq t \leq t_3$ lies within 2a% of the target value (where a is the reference of the offset, as mentioned earlier), the controlled variable is judged to have converged and the average value of the above duration is taken as being a steady-state value $y_s$. An example of convergence and an example of non-convergence are shown in FIG. 3.

② Oscillation judgment

Figure 4:
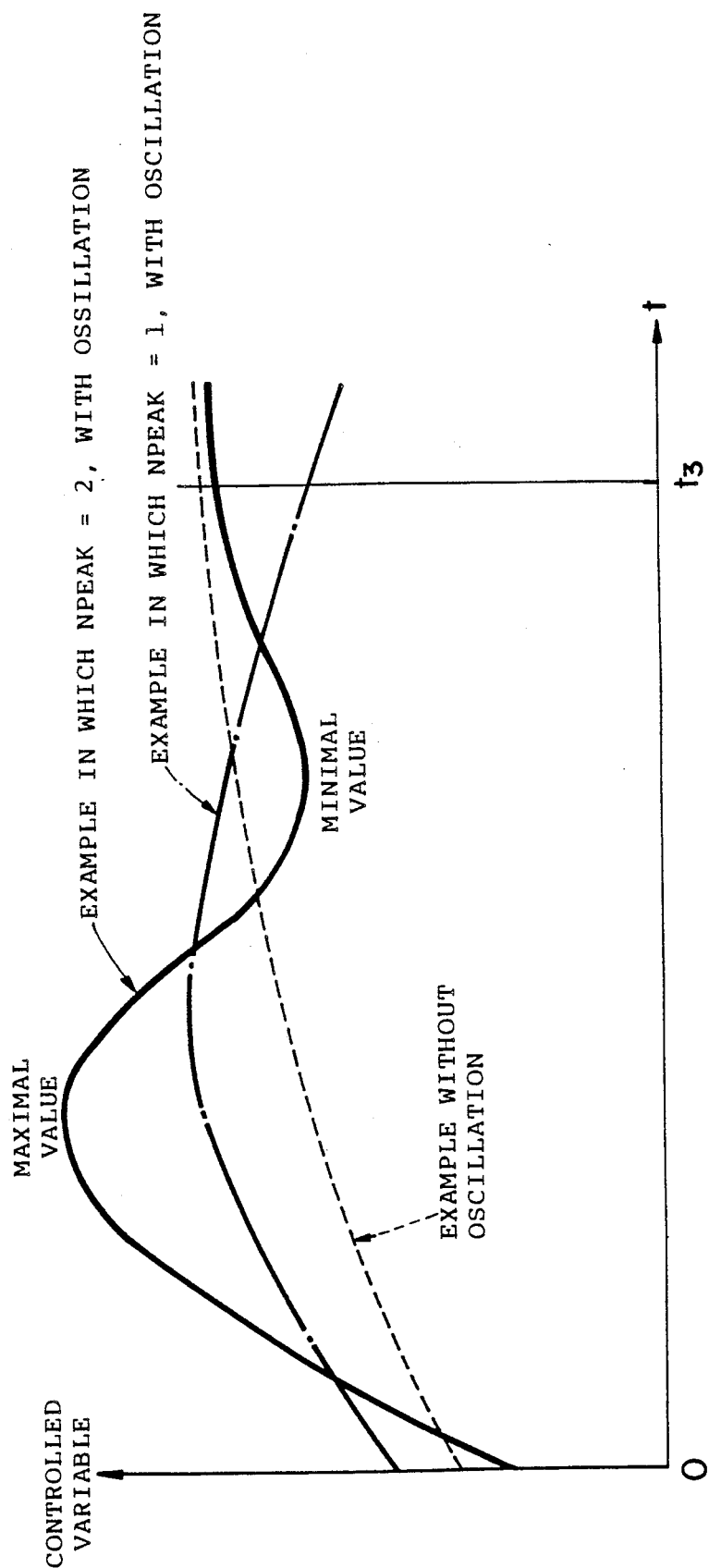
FIG. 4 is a graph for describing an oscillation judgment.

If the maximal value of the controlled variable appears during the observation unit time $t_3$, the controlled variable is judged to be oscillatory; if not, the controlled variable is judged to be non-oscillatory. The number of appearances of maximal and minimal values following the start of the observing action is represented by NPEAK. FIG. 4 illustrates an example in which NPEAK is 1 in case of an oscillatory judgment, an example in which NPEAK is 2 in case of an oscillatory judgment and an example in case of a non-oscillatory judgment.

③ Maximum value range judgment

A maximum value range index IMAX is decided and set as follows in accordance with the range of a maximum value $y_{max}$ of the controlled variable during the observation unit time $t_3$. Here, r is the target value.

$IMAX = 2$ when $y_{max} \geq C$ (C: the abovementioned emergency overshoot limit)

$= 1$ when $C > y_{max} \geq [1 + (2b/100)]r$ (b: the aforementioned reference of the amount of overshoot)

Figure 5:
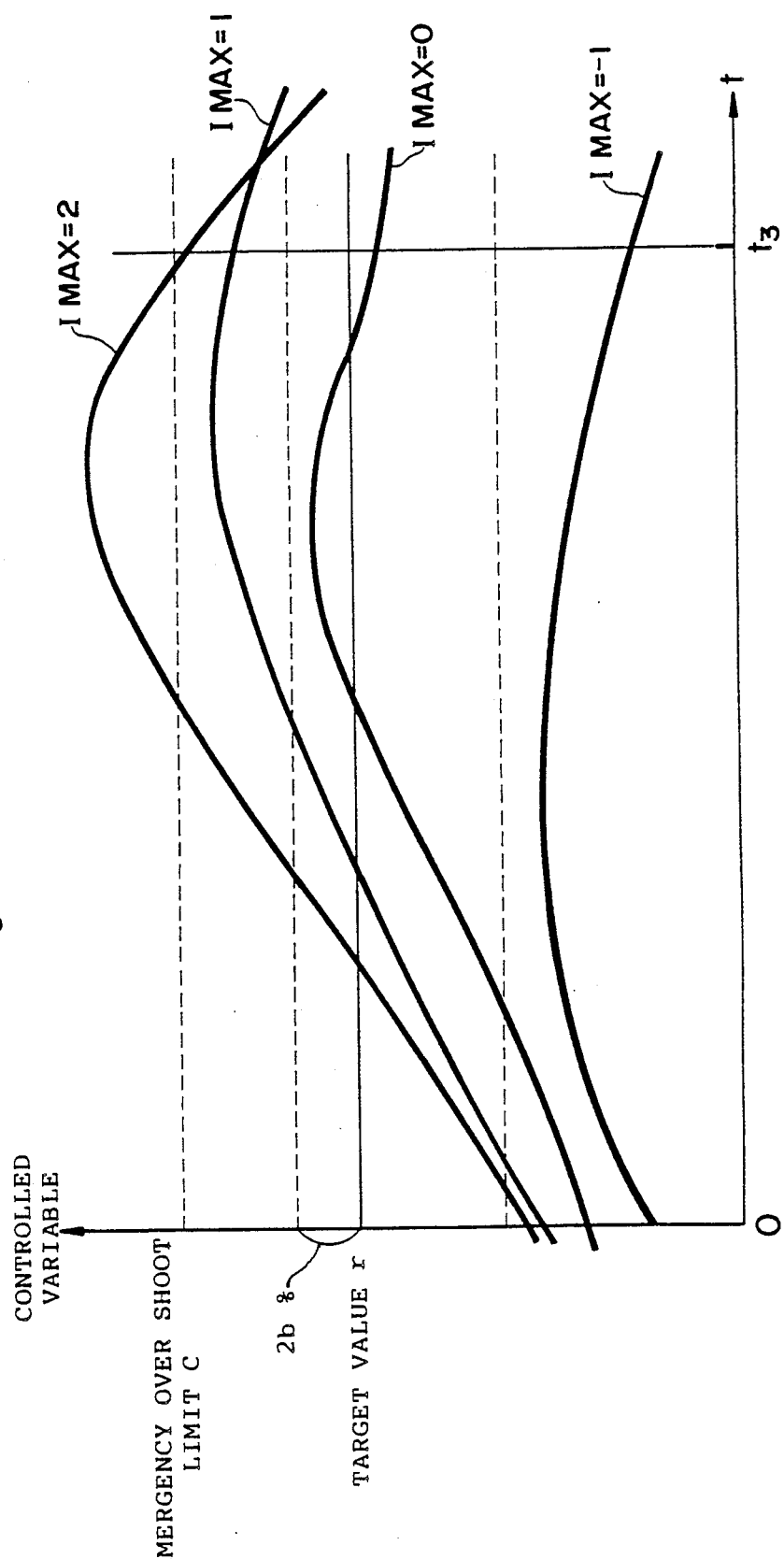
FIG. 5 is a graph for describing judgment regarding a maximum value range.

$= 0$ when $[1 + (2b/100)]r \geq y_{max} \geq 0.63r$ $= -1$ when $y_{max} < 0.63r$ Examples for cases in which IMAX is 2, 1, 0 and −1 are shown in FIG. 5.

④ Stability judgment

Instability is judged to prevail when any of the following three events occur during the observation time unit $t_3$:

(4-1) IMAX=2;

(4-2) a case arises in which NPEAK≧2 holds in the oscillatory state, a maximal value $y_p$ greater than the target value r appears in the controlled variable y, and the relation $y \geq y_p$ is subsequently re-established after the output diminishes; and (4-3) when $y \geq r$ holds in the non-oscillatory state and, moreover, the second differential of y is positive.

If a judgment is rendered to the effect that instability prevails during the observing action, then the supervisor 4 shifts to the emergency state at this moment.

When the time $t_3$ elapses following the start of the observing action, the supervisor 4 classifies the results of judgment into the following four categories:

ⓐ The controlled variable has converged.

ⓑ The controlled variable has not converged and is oscillatory, with NPEAK≧3.

ⓒ The controlled variable has not converged and is oscillatory, with NPEAK<3.

ⓓ The controlled variable has not converged and is nonoscillatory.

In the cases of ⓐ and ⓑ, the designing action is started. In the cases of ⓒ and ⓓ, the observing action is continued for the time $t_3$ and distinction among the cases ⓐ, ⓑ, ⓒ, ⓓ is made again.

It is preferred that the supervisor 4 issue the following commands as accelerating actions with respect to the controller 3 when IMAX is 1 or −1:

(ACC1) When IMAX=−1 holds, the gain K is raised $p_1$ dB;

(ACC2) When IMAX=1 holds, the gain K is raised $p_2$ dB.

The values of $p_1$, $p_2$ will be discussed hereinbelow. The time required for the controlled variable to converge to the target value is shortened by these parameter commands. The numbers of times the abovementioned acceleration actions are performed by the beginning of the designing action are stored as NACC1, NACC2, respectively.

Elapsed time from the moment observation starts is calculated at the moment the designing action is started, and this is stored as unit $t_3$ for the next observing action. During the designing action, only the judgment of stability is continued as the observing action. When the target value changes during the observing action, the observing action is started anew.

The designing action comprises calculating a characteristic quantity, calculating a compensating element, and issuing the commensurate propagating commands and parameter commands. The characteristic quantity calculated is as shown in Table 1.

TABLE 1

| CASE | CALCULATION OF CHARACTERISTIC QUANTITY CHARACTERISTIC QUANTITY CALCULATED |
|---|---|
| CONVERGING, IMAX < 0 | SETTING TIME $t_s$, OFFSET $\epsilon$ |
| CONVERGING, IMAX = 1 | SETTING TIME $t_s$, OFFSET $\epsilon$, CLOSED LOOP RESONANCE ANGULAR FREQUENCY $\omega p$. OVERSHOOT Ap (%) |
| NON-CONVERGING | CLOSED LOOP RESONANCE ANGULAR FREQUENCY $\omega p$. OVERSHOOT Ap (%) |

Since IMAX takes on the values of −1, 0, 1, 2 and IMAX=2 is judged to indicate instability, a case in which "CONVERGING IMAX >1" holds is impossible.

The setting time $t_s$, offset $\epsilon$ and overshoot amount $A_p$ among these characteristic quantities are obtained directly from the target value r and controlled variable measurement data y in a manner set forth below. Here, $t_s$, $\epsilon$, $A_p$ are given by the following equations:

$t_s =$ (time at which the controlled variable falls within $2a\%$) − (time at which the observing action starts)

$\epsilon = y - r$ $A_p = \{(y-r)/r\} \times 100$ (%)

The closed loop resonance angular frequency $\omega_p$ is estimated as follows using an approximate expression:

(WP1) When the controlled variable is oscillatory, NPEAK≧3 holds and, moreover, the attenuation ratio is more than 5%, $w_p$ is estimated as follows, with $\tau_1$ being a first maximal time (a time at which a first maximal value appears) and $\tau_2$ being a second maximal time (a time at which a second maximal time appears):

$$\omega_p = 2\pi/(\tau_2 - \tau_1) \quad (7)$$

(WP2) In cases other than the foregoing, $w_p$ is estimated as follows using the abovementioned average value (steady-state value) $y_s$, with $y_{max1}$ being a first maximal value and $\tau_1$ being a first maximal time:

$q = log(y_{max1} - y_s)/y_s$ $\xi = q/(q^2 + \pi^2)^{\frac{1}{2}}$ $$\omega_p = \pi/\tau_1(1-\xi^2)^{1/2} \quad (8)$$

Here $y_s$ is a steady-state value which has meaning only at convergence. A case is possible in which a transition is made to the designing action even if convergence does not occur (see the abovementioned case ⓑ). In this case, $y_s$ is taken as the average of the first minimal value and second maximal value.

The attenuation ratio referred to here is given by $(a_2/a_1) \times 100\%$ in a case where $a_1$ represents the preceding amplitude of oscillation of the oscillating controlled variable and $a_2$ represents the present amplitude of oscillation thereof.

The decision regarding the compensating element (which refers to the proportional integration element and phase elements) is made in accordance with Table 2.

without saying that other suitable magnifications can be selected.

When a transition is made to the emergency state, the supervisor first performs the following emergency actions:

TABLE 2
COMPENSATING ELEMENT DECISION

| (CONVERGENCY) | CASE (OVERSHOOT $A_p$) | (SETTING TIME $t_s$) | (OFFSET) | COMPENSATING ELEMENT PROPAGATION AND ALTERATION |
|---|---|---|---|---|
| CONVERGENT | NO OVERSHOOT, OR $A_p \leq a$ | $t_s \leq t_1$ | $-a \leq \epsilon$ | NO ALTERATION |
|  |  |  | $\epsilon < -a$ | RAISE GAIN K BY $p_3 - p_1 \times$ NACC1 (dB) (Note 1). (D2) IF GAIN K WAS LOWERED AT TIME OF PRECEDING DESIGN. |
|  |  | $t_s < t_1$ |  | RAISE GAIN K BY $p_4 - P_1 \times$ NACC1 (dB) (Note 1). (D2) IF GAIN K WAS LOWERED AT TIME OF PRECEDING DESIGN. |
|  | $a < A_p \leq b$ | $t_s \leq t_1$ | $\|\epsilon\| \leq a$ | NO ALTERATION |
|  |  |  | $\|\epsilon\| > a$ | (D1) |
|  |  | $t_s > t_1$ |  | (D2) |
|  | $A_p > b$ |  |  | LOWER GAIN BY $p_5 - p_s \times$ NACC2 (Note 1). |
| NON-CONVERGENT | $A_p \leq b$ |  |  | (D2) |
|  | $A_p > b$ |  |  | LOWER GAIN BY $p_6 - p_2 \times$ NACC2 (Note 1). |

(Note 1)
NO ALTERATION WHEN INCREASE OR DECREASE IN GAIN K IS NEGATIVE VALUE. DISCUSSION REGARDING $p_1 \sim p_6$ GIVEN BELOW.

(D1) and (D2) in Table 2 accompany propagation of the compensating element. The contents thereof are as follows:

(D1) A proportional integration element or phase delay is inserted. D1 is divided into the following two cases depending upon what is designated by the operator and the status of the propagating-type controller 3:

(D1-LAG) In a case where use of the integration element is forbidden by the operator, or in a case where $T_0 > 0$ already holds [i.e., the (proportional) integration element is being used], the phase elements are increased by one. The parameters of the additional phase element shall be $T_i = 20/\omega_p$, $\gamma_i = 5$ (This phase element acts as a phase delay.)

(D1-PI) In a case where use of an integration element is allowed and, moreover, $T_0 = 0$ holds [i.e., a (proportional) integration element has not yet been used], $G_{Pl}(s)$ is changed from the proportional element to the proportional integration element. The value of the parameter $T_0$ shall be $T_0 = 20/\omega_p$ (D2) The phase elements are increased by one. The parameters of the additional phase element shall be $T_i = 2.23/\omega_p$, $\gamma_i = 0.2$ (This phase element acts as a phase advance element.) The abovementioned values regarding $T_i$, $\gamma_i$, $T_0$ and the like illustrate examples and should be suitably determined based on a simulation or the like.

If (D2) is being executed when the designing action ends, the value of the stored observation unit time $t_3$ is made ¼ of itself. If the output is converging, the value of $t_3$ is reset to a value which is twice $t_s$, or to the smallest value among the several values of $t_3$ used earlier. The value of ¼ or the like is an example only, and it goes tions:
(EM1) The gain is lowered $p_7$ dB if (D1) is not being executed by the immediately preceding designing action.

(EM2) The element propagated in (D1) is removed if (D1) is being executed by the immediately preceding designing action.

After the foregoing emergency actions are performed, the following judgments are made regarding the divergency status of the controlled variable every $t_0$, where $t_0$ is a time period for monitoring and is determined by the operator:

(DIV1) $y > C$ (C: emergency overshoot limit), and the differential of y is positive;

(DIV2) $C \geq y > 2b$, and the second differential of y is positive; and (DIV3) $2b > y > 2a$ and the second differential of y is positive.

The gain K is lowered $p_8$ dB when the criterion (DIV1) is satisfied, $p_9$ dB when the criterion (DIV2) is satisfied, and $p_{10}$ dB when the criterion (DIV3) is satisfied. If none of the criteria (DIV1), (DIV2), (DIV3) are satisfied consecutively three times, the emergency state is cancelled.

Though the range $p_1 \sim p_{10}$ of gain modification during the foregoing action can also be set by the operator through the input unit 5, ordinarily it will suffice to select any one of the values from among the following two types categories:

| (Quick-response setting) |
|---|
| $p_1 = 1.5$, $p_2 = 2$, |
| $p_3 = p_4 = 3$, $p_5 = p_6 = 3$, $p_7 = 6$ |
| $p_8 = p_9 = 1.5$, $p_{10} = 0$ |
| (Safe-type setting) |
| $p_1 = 1.0$, $p_2 = 1.5$, $p_3 = p_4 = 2$ |
| $p_5 = p_6 = 3$, $p_7 = p_8 = p_9 = p_{10} = 6$ |

The quick-response setting referred to here is for the purpose of shortening the time required to approach the target value The safe-type setting is useful in a case where the operator does not have expertise regarding the controlled system and signifies a setting which is not likely to bring about an instability phenomenon. Further, the values of $p_1 \sim p_{10}$ are illustrative of examples only.

(5) Flow of Overall Operation in Control Apparatus

Figure 6:
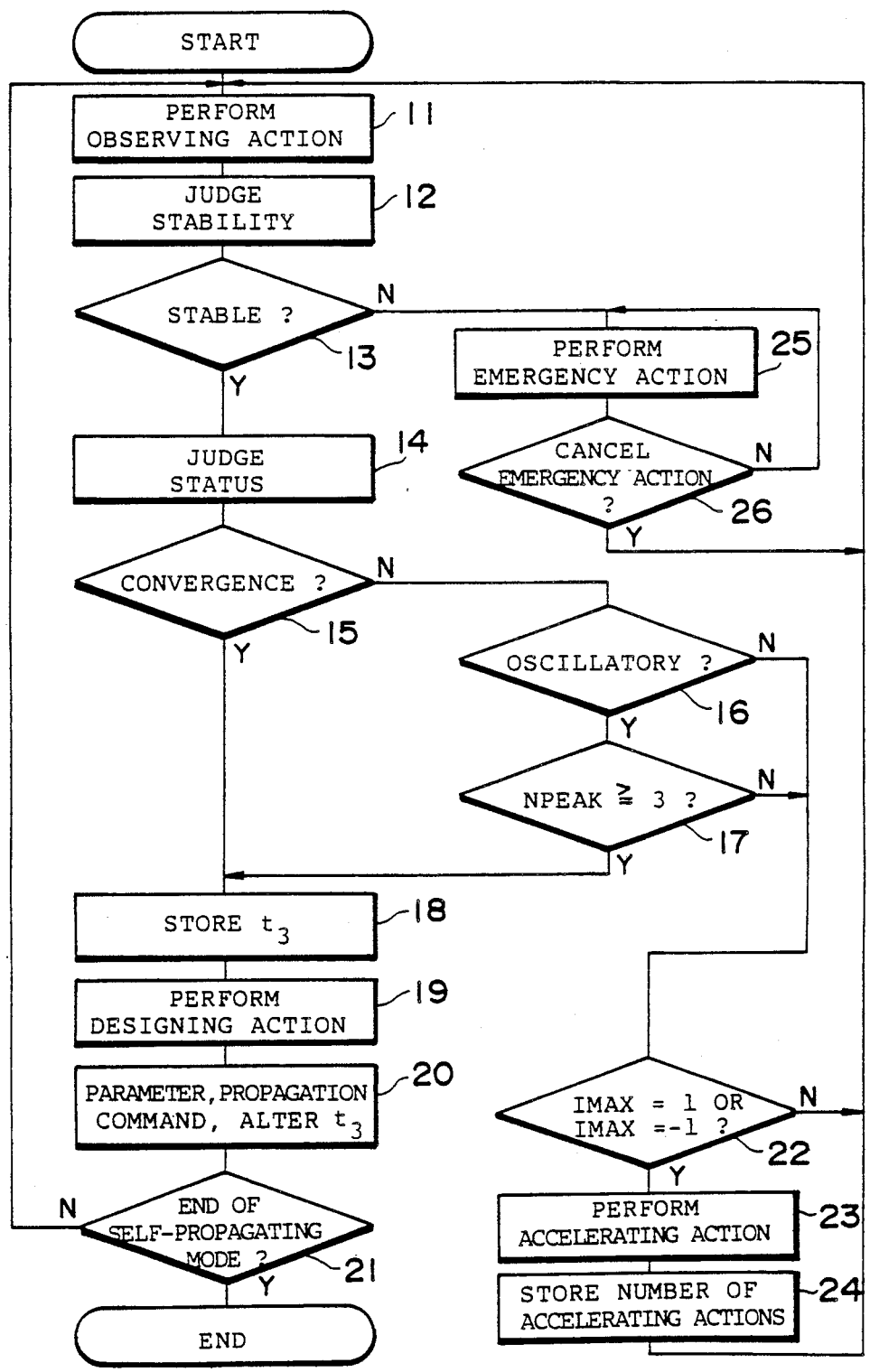
FIG. 6 is a flowchart illustrating the operation of the supervisor in the self-propagating mode.

FIG. 6 illustrates the flow of the above-described actions performed by the supervisor 4 in the self-propagating mode.

In the action for observing the controlled variable of the controlled system 1 in the ordinary operating state, namely in step 11 of the flowchart of FIG. 6, the judgment regarding stability is made at steps 12, 13 in accordance with the decisions regarding conditions (4-1), (4-3) mentioned above. If the controlled variable is stable, then a check is performed at steps 14, 15, 16, 17 to see whether the conditions [ ⓐ , ⓑ mentioned above] for starting the designing action have been satisfied by the stipulations of convergency, oscillation and maximum value range. If these conditions are satisfied, the observation unit time $t_3$ is stored and the designing action is carried out at steps 18, 19. If a parameter command and/or propagating command for the propagating-type controller 3 is necessary in accordance with Table 2, then the command to this effect is generated; if unnecessary, the time $t_3$ is altered at step 20. The foregoing processing continues to be repeated as long as the self-propagating mode prevails (step 21).

In a case where a judgment is rendered at step 22 to the effect that the accelerating action is required even if the conditions for starting the designing action have not been satisfied, the commensurate accelerating action is performed at step 23, the numbers of times NACC1, NACC2 this action is performed are stored at step 24, and the program returns to the observing action. If the accelerating action is not required, the program returns to the observing action. The processing of steps 22-24 is not necessarily required.

If instability is determined at step 13, the program proceeds to the emergency action and the abovementioned command (EM1) or (EM2) is applied to the controller 3 at step 25. The emergency operation continues until the conditions for cancellation are satisfied (step 26).

In a case where the fixed mode is in effect, the supervisor 4 applies the parameters, which enter from the input unit 5, as they stand to the controller 3 as parameter commands. However, the flow for this is deleted from the drawings.

Figure 7:
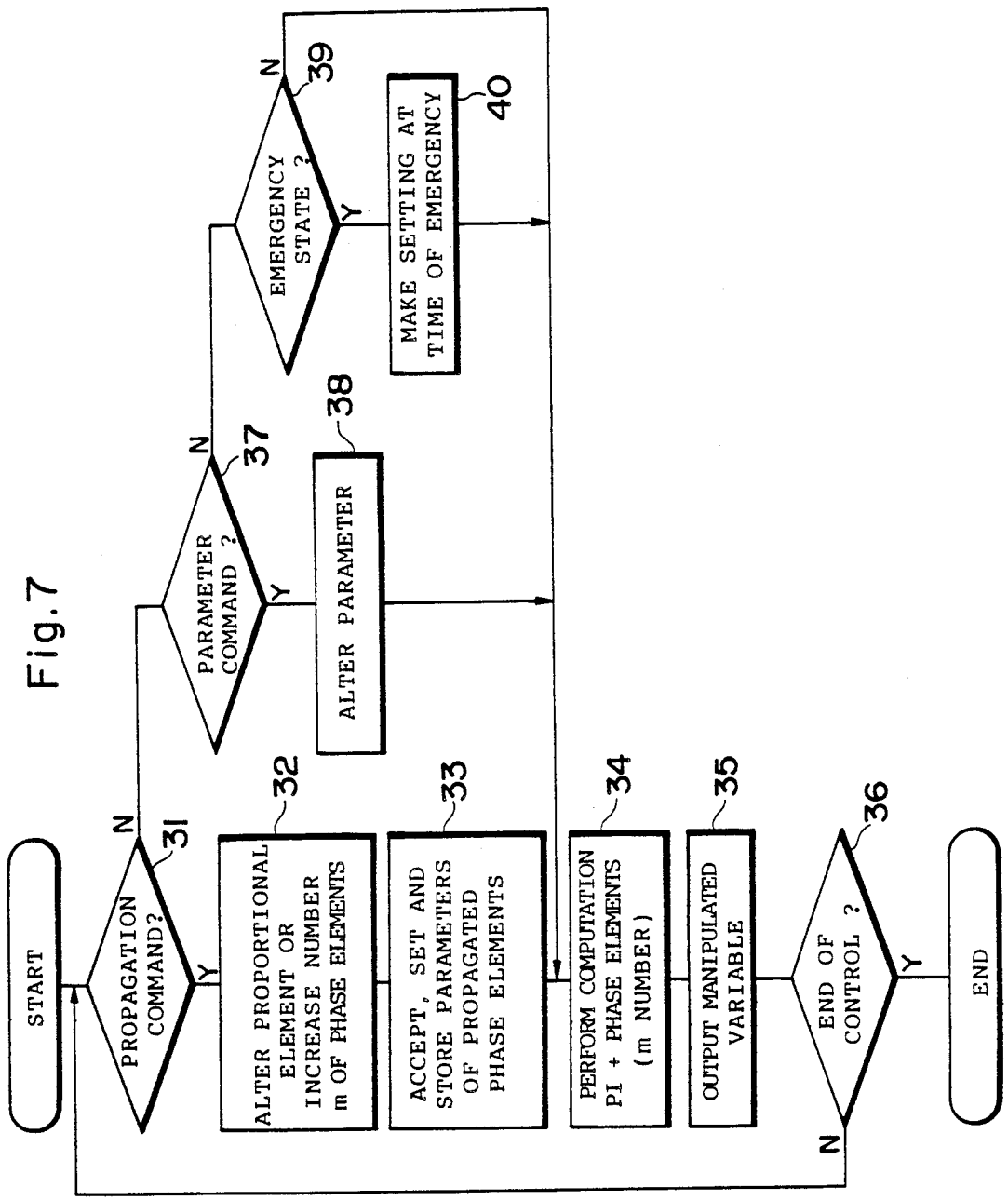
FIG. 7 is a flowchart illustrating the operation of a propagating-type controller when the supervisor is in the self-propagating mode.

FIG. 7 illustrates the processing procedure of the propagating-type controller 3.

If the supervisor 4 is operating in the self-propagating mode, the supervisor 4 applies a propagation command (inclusive of a parameter command), a parameter command or a command indicating that the emergency state is in effect to the controller 3, so that the controller 3 decodes these commands.

If the command is a propagation command (step 31), the particulars of the command are executed Specifically, the proportional element is changed to a proportional integration element or the number of phase elements is increased (the change or increase is stored in memory) at step 32, and the parameters relating to these elements are stored in memory at step 33. Processing is performed serially in successive fashion with regard to changed or increased proportional integration element and phase elements at step 34, and the manipulated variable obtained as a result is outputted at step 35.

In the case of a parameter (step 37), the parameter in memory is altered at step 38 and the abovementioned processing and manipulated variable output processing steps are performed (steps 34, 35).

In case of the emergency state (step 39), processing regarding the aforementioned (EM1) or (EM2) is performed at step 40 in accordance with the command.

If the supervisor 4 is operating in the fixed mode, the P setting, PI setting, PID setting and optional setting are performed as set forth above, and the necessary parameters are entered. Accordingly, the type of elements set, the number and the parameters thereof are applied from the supervisor 4 to the controller 3. In accordance with the commands applied thereto, the controller 3 performs the processing of steps 32, 33 and executes the processing of steps 34, 35 at a fixed period. If there is a parameter change in the course of processing, a signal to this effect is applied from the supervisor 4 to the controller 3, so that the controller 3 executes the processing of step 38.

(6) Results of Simulation

The results of operating the above-described self-propagating control apparatus in a digital simulator will now be discussed. In the graphs of FIGS. 8a through 11b, the solid lines indicate controlled variables and the dashed lines indicate target values. The horizontal axis in each of these graphs is normalized in terms of time, and the vertical axis represents an arbitrary scale.

(6.1) Typical example of operation

Figure 8A:
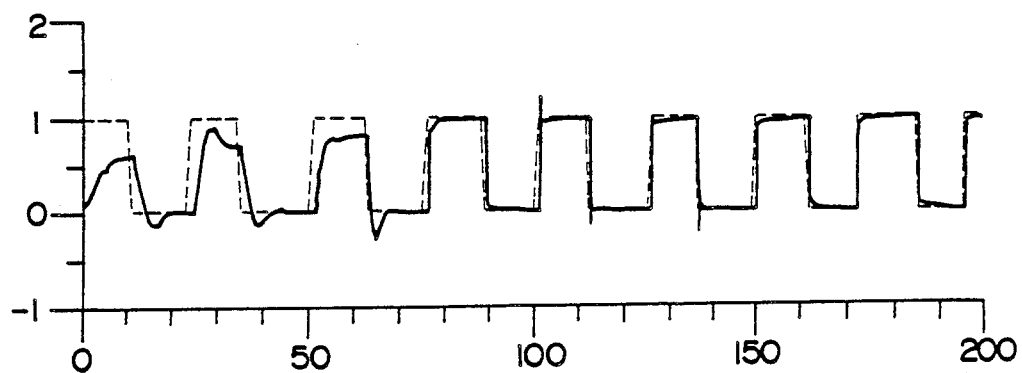
Figure 8B:
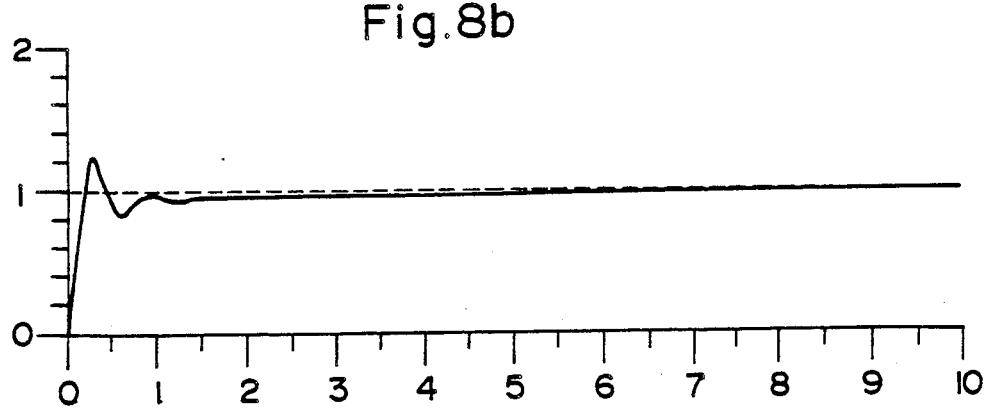

An example of operation in a case where the transfer function $$G(s)=[0.4+(s+0.75)]/[(s+0.3)(s+0.5)(s+1)(s+2)]$$

holds is illustrated in FIGS. 8a, b, where it is assumed that $$a=2\%, \ b=20\%, \ t_1=5 \ sec, \ t_2=5 \ sec$$

hold and that use of an integration element is allowed FIG. 8a illustrates the course of improvement in control capability, and FIG. 8b illustrates an indicial response waveform eventually obtained. A single PI element and three phase elements are used in the final stage.

(6.2) Comparison (1) with PID indicating controller

Figure 9A:
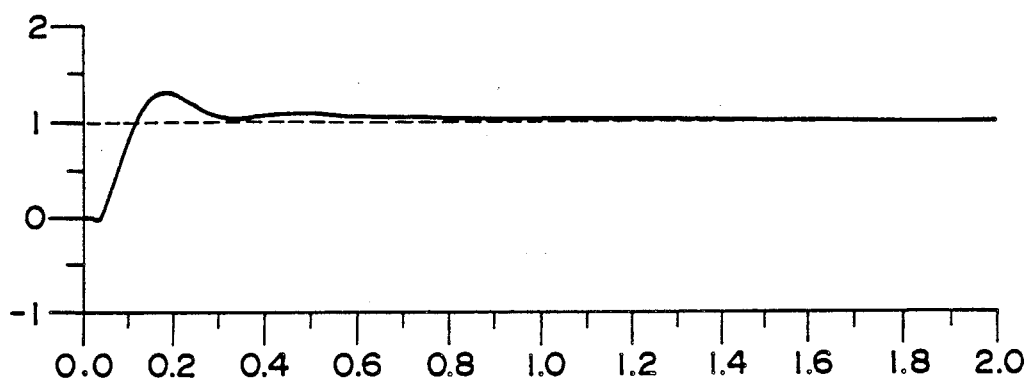

FIG. 9a shows a response waveform attained by the self-propagating control apparatus in a case where the transfer function of the controlled system is $$G(s)=[3/(1+5s)]e^{-.05s}$$

Figure 9B:
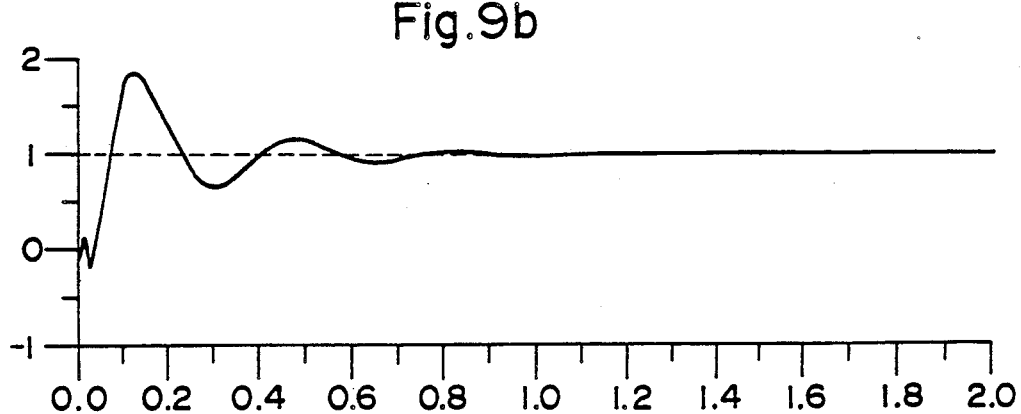

FIG. 9b shows a response waveform based on a PID indicating controller designed in accordance with the Chien-Hrones-Reswick method (see "Automatic Control Handbook", edited by the Measurement Automatic Control Society, Second Edition, Chapter 1, pp. 461-479, Corona-sha, 1957). It will be understood that the self-propagating control apparatus is superior.

(6.3) Comparison (2) with PID indicating controller

Figure 10A:
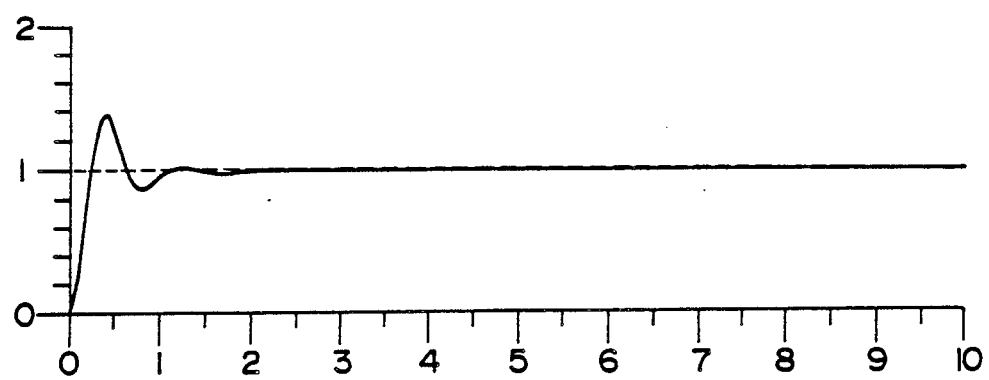

FIG. 10a shows a response waveform attained by the self-propagating control apparatus in a case where the transfer function of the controlled system is $$G(s)=5/(s^3+6s^2+11s+6)$$

Figure 10B:
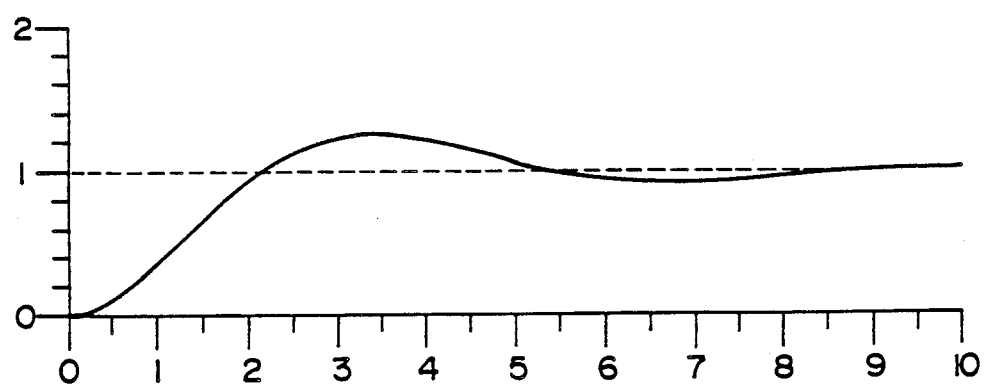

FIG. 10b shows a response waveform based on a PID indicating controller designed in accordance with the Ziegler-Nichols transient response method (see the abovementioned "Automatic Control Handbook"). It will be understood that the former is superior.

(6.4) Comparison with adaptive control apparatus

Figure 11A:
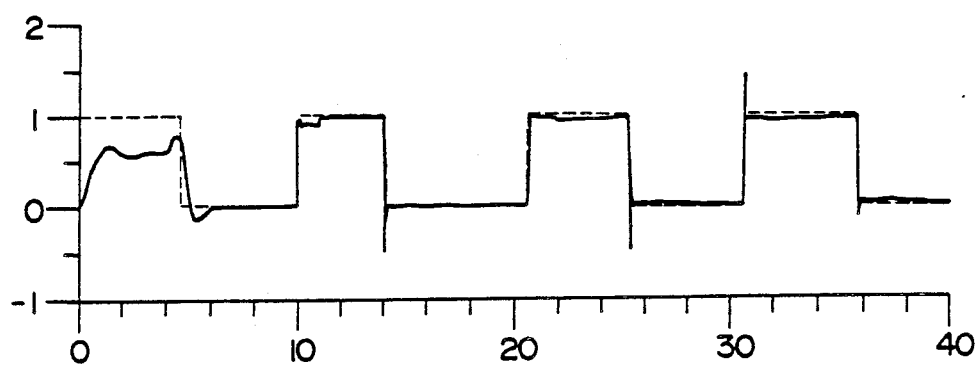

FIG. 11a shows a response waveform attained by the self-propagating control apparatus when the transfer function of the controlled system fluctuates as follows:

$$G(s) = \begin{cases} 1/(1 + 0.5s + 0.25s^2) & 0 \leq t < 20 \\ 1/(1 + 0.58s + 0.083s^2) & t \geq 20 \end{cases}$$

Figure 11B:
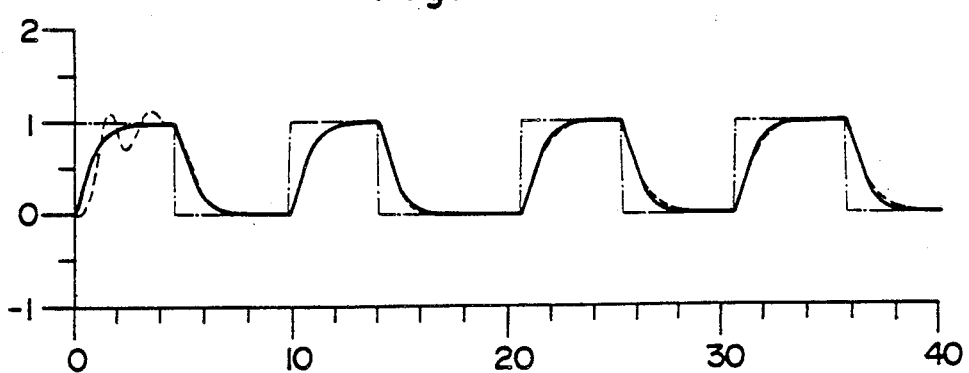

FIG. 11b shows a response waveform based on the normative model-type control apparatus. It will be appreciated that the former excels in follow-up characteristic. The normative model-type control apparatus was designed for a controlled system at time $t = 0$ in accordance with a standard method set forth in the abovementioned literature "Adaptive Control" by Ichikawa, et. al. The normative model used is expressed by $$G_r(s) = [6/(s+2)(s+3)]$$

As many apparently widely different embodiments of the present invention can be made without departing from the spirit and scope thereof, it is to be understood that the invention is not limited to the specific embodiments thereof except as defined in the appended claims.

What is claimed is:

1. A self-propagating control apparatus comprising:
   a propagating-type controller, to which a controlled variable obtained from a controlled system and a given target value are applied as inputs, for calculating and outputting a manipulated variable for the controlled system; and
   a supervisor for controlling said propagating-type controller;
   said propagating-type controller including:
   a proportional integration element and a plurality of phase elements; and
   control means which, in accordance with a command from said supervisor, creates a serially arrayed structure of the proportional integration element and a commanded number of the phase elements and applies commanded parameters to the integration and phase elements, and which, in response to an offset between the target value and the controlled variable outputs, as the manipulated variable, a response of said serially arrayed structure; and
   said supervisor including:
   means for judging the status of a control system based on the given target value and the controlled variable; and
   propagating control means for calculating a characteristic quantity of the controlled system when the judging means determines that the controlled system has a predetermined status, and applying a command relating to the number of phase elements and the parameter of each element to said propagating-type controller based on the characteristic quantity or an inputted initial command.

2. A self-propagating control method comprising the steps of:
   creating a serially connected structure of a proportional integration element and one or more phase elements required to be combined with the proportional integration element by an initial command and applying parameters to these elements in response to the initial command;
   calculating a characteristic quantity of a controlled system based on a given target value and a controlled variable and judging, based on the characteristic quantity, whether to increase the plurality of phase elements; and
   when judging that the plurality of phase elements are to be increased, creating parameters of the additional phase elements, adding these phase elements to said serially connected structure and connecting them thereto.

3. A propagating-type controller, to which a controlled variable obtained from a controlled system and a given target value are applied as inputs, for calculating and outputting a manipulated variable for the controlled system, said propagating-type controller being controlled by a supervisor and comprising:
   a proportional integration element and a plurality of phase elements; and
   control means which, in accordance with a command from said supervisor, creates a serially arrayed structure of the proportional integration element and a commanded number of the phase elements and applies commanded parameters to these elements, and which outputs, as the manipulated variable, a response of said serially arrayed structure to an offset between the target value and controlled variable.

4. A method of operating a propagating-type controller, to which a controlled variable obtained from a controlled system and a given target value are applied as inputs, for calculating and outputting a manipulated variable for the controlled system, said propagating-type controller being controlled by a supervisor, said method comprising the steps of:
   decoding commands from said supervisor;
   increasing a number of phase elements and setting parameters thereof when the commands include a propagation command; and
   outputting the manipulated variable upon executing processing, with respect to an offset between the inputted target value and controlled variable, in accordance with a proportional integration element and the phase element or elements inclusive of the increased number of phase elements.

5. A supervisor for controlling a propagating-type controller having a structure in which a proportional integration element and a requisite number, inclusive of zero, of phase elements are serially arrayed, said supervisor comprising:
   means for judging whether a controlled system is stable based on an inputted controlled variable;
   means for judging status inclusive of a convergency judgment, oscillation judgment and maximum value range judgment when the controlled system is judged to be stable;
   means for calculating a characteristic quantity of the control system when the judged states satisfy given conditions; and
   means for judging, based on the calculated characteristic quantity, whether the phase elements are to be increased, and for deciding when to increase the number of phase elements.

6. A control method for controlling a propagating-type controller having a structure in which a proportional integration element and a requisite number, inclusive of zero, of phase elements are serially arrayed, said method comprising the steps of:

judging whether a controlled system is stable based on an inputted controlled variable;

judging status inclusive of a convergency judgment, oscillation judgment and maximum value range judgment when the controlled system is judged to be stable;

calculating a characteristic quantity of the control system when the judged states satisfy given conditions;

judging, based on the calculated characteristic quantity, whether the phase elements are to be increased; and deciding parameters of these elements when they are to be increased.

7. The control method according to claim 6, further comprising a step of generating an emergency operation command when it is judged that the controlled system is not stable.

8. The control method according to claim 6, further comprising a step of generating an acceleration action command if, when a judged status does not satisfy a given condition, the condition is a fixed mode condition.

* * * * *

UNITED STATES PATENT AND TRADEMARK OFFICE
CERTIFICATE OF CORRECTION

PATENT NO. : 4,992,927
DATED : February 12, 1991
INVENTOR(S) : Mitsuhiko Araki

It is certified that error appears in the above-identified patent and that said Letters Patent is hereby corrected as shown below:

ON THE TITLE PAGE:
[73] At Assignee

"Omron Tateisi Electronics Co., Kyoto, Japan" should read
--Omron Tateisi Electronics Co., Kyoto, Japan (part interest)--.

Signed and Sealed this

Second Day of March, 1993

Attest:

STEPHEN G. KUNIN

*Attesting Officer*   Acting Commissioner of Patents and Trademarks